US012597160B2

(12) United States Patent
Hayashi

(10) Patent No.: US 12,597,160 B2
(45) Date of Patent: Apr. 7, 2026

(54) METHOD, SYSTEM, AND COMPUTER PROGRAM FOR RECOGNIZING POSITION AND POSTURE OF OBJECT

(71) Applicant: SEIKO EPSON CORPORATION, Tokyo (JP)

(72) Inventor: Masaki Hayashi, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 393 days.

(21) Appl. No.: 18/323,491

(22) Filed: May 25, 2023

(65) Prior Publication Data

US 2023/0386075 A1      Nov. 30, 2023

(30) Foreign Application Priority Data

May 26, 2022      (JP) .................................. 2022-085963

(51) Int. Cl.
*G06T 7/73*        (2017.01)
*B25J 9/16*        (2006.01)
*G06T 7/50*        (2017.01)

(52) U.S. Cl.
CPC ................. *G06T 7/73* (2017.01); *B25J 9/163* (2013.01); *B25J 9/1697* (2013.01); *G06T 7/50* (2017.01); *B25J 9/1612* (2013.01); *G06T 2207/20081* (2013.01); *G06T 2207/30164* (2013.01)

(58) Field of Classification Search
CPC ... G06T 7/73; G06T 7/50; G06T 2207/20081; G06T 2207/30164; G06T 7/70; G06T 2207/10028; G06T 2207/20084; G06T 2207/10004; B25J 9/163; B25J 9/1697; B25J 9/1612; G05B 2219/39543; G05B 2219/40564

USPC .......................................................... 382/159
See application file for complete search history.

(56) References Cited

U.S. PATENT DOCUMENTS

| | | | |
|---|---|---|---|
| 12,198,369 B2 * | 1/2025 | Sekii .......................... | G06T 7/70 |
| 2018/0211138 A1 | 7/2018 | Yamada et al. | |
| 2019/0164301 A1 * | 5/2019 | Kim ......................... | G06T 19/20 |

(Continued)

FOREIGN PATENT DOCUMENTS

| | | | | |
|---|---|---|---|---|
| CN | 105069804 | * | 4/2018 | ... G06T 2207/10016 |
| JP | 2014161937 | * | 9/2014 | |
| JP | 2016-157188 A | | 9/2016 | |

(Continued)

*Primary Examiner* — Jerome Grant, II
(74) *Attorney, Agent, or Firm* — Harness, Dickey & Pierce, P.L.C.

(57) ABSTRACT

A method according to an aspect of the present disclosure includes generating an object image by capturing an image of the object with a camera, determining estimated depths of the object by using a depth estimator that receives the object image as input and outputs the estimated depths in the object image, determining whether the estimated depths are useable by using an identifier that receives at least one of the object image and an object image feature quantity extracted from the object image as input, when the estimated depths are usable, recognizing the position and posture of the object by using the estimated depths and the object image, and when the estimated depths are unusable, determining measured depths of the object with a depth sensor and recognizing the position and posture of the object by using the measured depths and the object image.

6 Claims, 10 Drawing Sheets

(56)     References Cited

U.S. PATENT DOCUMENTS

2020/0334843  A1     10/2020  Kasuya et al.
2022/0215567  A1      7/2022  Irie et al.

FOREIGN PATENT DOCUMENTS

JP          2018048890      *   3/2018
WO      WO2008041661      *   4/2008   ............. G06T 15/40
WO          2020-230214  A1    11/2020

* cited by examiner

Figure 8B:
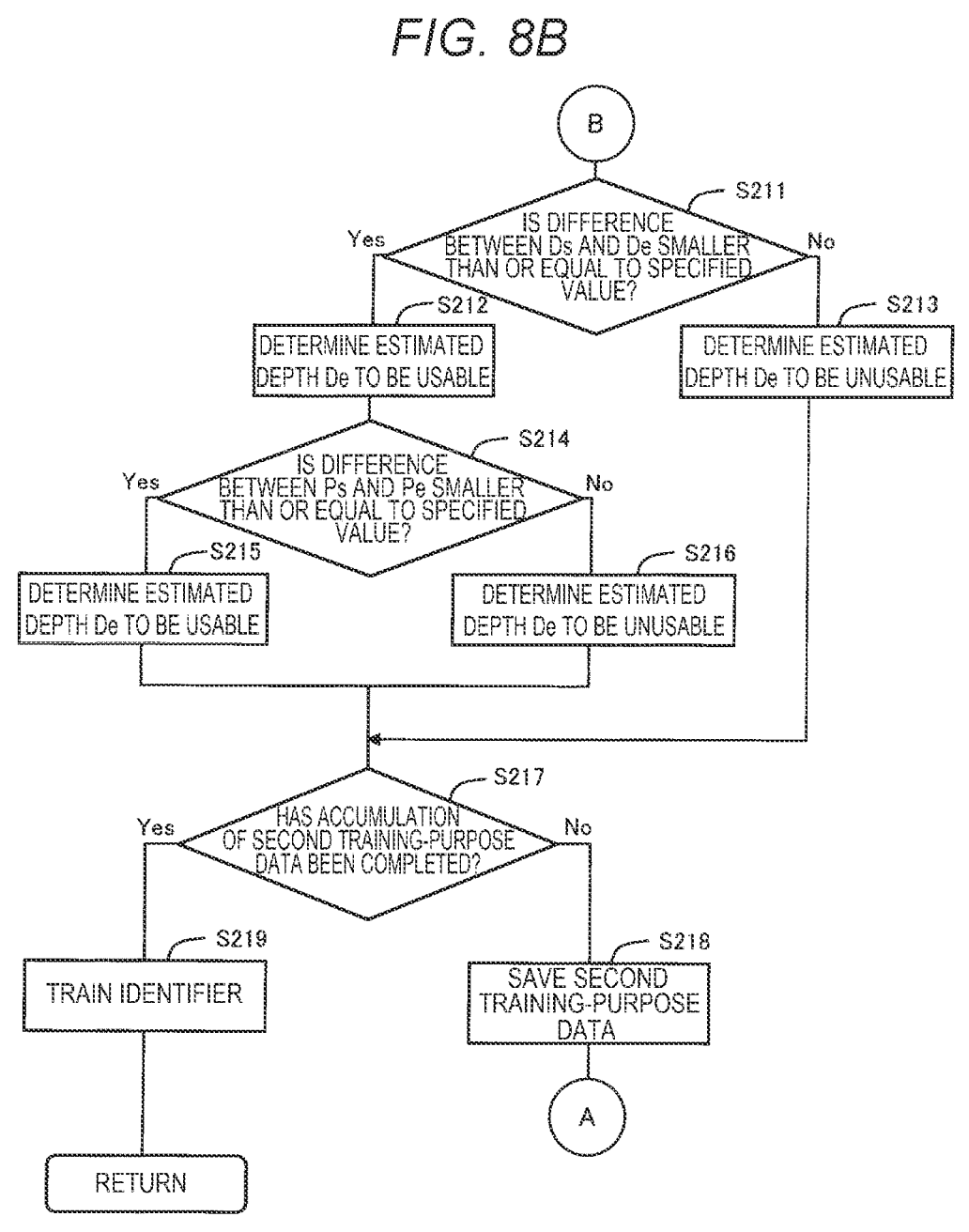

S211
IS DIFFERENCE BETWEEN Ds AND De SMALLER THAN OR EQUAL TO SPECIFIED VALUE?

Yes

No

S212
DETERMINE ESTIMATED DEPTH De TO BE USABLE

S213
DETERMINE ESTIMATED DEPTH De TO BE UNUSABLE

S214
IS DIFFERENCE BETWEEN Ps AND Pe SMALLER THAN OR EQUAL TO SPECIFIED VALUE?

Yes

No

S215
DETERMINE ESTIMATED DEPTH De TO BE USABLE

S216
DETERMINE ESTIMATED DEPTH De TO BE UNUSABLE

S217
HAS ACCUMULATION OF SECOND TRAINING-PURPOSE DATA BEEN COMPLETED?

Yes

No

S219
TRAIN IDENTIFIER

S218
SAVE SECOND TRAINING-PURPOSE DATA

A

RETURN

METHOD, SYSTEM, AND COMPUTER PROGRAM FOR RECOGNIZING POSITION AND POSTURE OF OBJECT

The present application is based on, and claims priority from JP Application Serial Number 2022-085963, filed May 26, 2022, the disclosure of which is hereby incorporated by reference herein in its entirety.

BACKGROUND

1. Technical Field

The present disclosure relates to a method, a system, and a computer program for recognizing the position and posture of an object.

2. Related Art

There is a known robot system that uses a camera to recognize the position and posture of an object and causes a robot to pick up the object. In general, to recognize an object, depth information is used in many cases in addition to normal images. WO 2020/230214 discloses a technology for estimating depths from stereo images or a monocular-view image by using a depth estimator based on deep learning. The technology allows quick acquisition of depths from a single captured image.

The related-art technology described above, however, has a problem of incorrect depth estimation in a case where an image that greatly differs from a teacher image is inputted to the depth estimator.

SUMMARY

According to a first aspect of the present disclosure, there is provided a method for recognizing a position and a posture of an object. The method includes (a) generating an object image by capturing an image of the object with a camera, (b) determining estimated depths of the object by using a depth estimator that receives the object image as input and outputs the estimated depths in the object image, (c) determining whether the estimated depths are useable by using an identifier that receives at least one of the object image and an object image feature quantity extracted from the object image as input and outputs a state in which the estimated depths are usable or unusable, (d) when the estimated depths are usable, recognizing the position and posture of the object by using the estimated depths and the object image, and (e) when the estimated depths are unusable, determining measured depths of the object with a depth sensor and recognizing the position and posture of the object by using the measured depths and the object image.

According to a second aspect of the present disclosure, there is provided a system for recognizing a position and a posture of an object. The system includes a camera that captures an image of the object, a depth sensor that measures depths of the object, and a recognition section that recognizes the position and posture of the object. The recognition section (a) generates an object image by capturing an image of the object with the camera, (b) determines estimated depths of the object by using a depth estimator that receives the object image as input and outputs the estimated depths in the object image, (c) determines whether the estimated depths are useable by using an identifier that receives at least one of the object image and an object image feature quantity extracted from the object image as input and outputs a state in which the estimated depths are usable or unusable, (d) when the estimated depths are usable, recognizes the position and posture of the object by using the estimated depths and the object image, and (e) when the estimated depths are unusable, determines measured depths of the object with the depth sensor and recognizes the position and posture of the object by using the measured depths and the object image.

According to a third embodiment of the present disclosure, there is provided a computer program that causes a processor to recognize a position and a posture of an object. The computer program causes the processor to (a) generate an object image by capturing an image of the object with a camera, (b) determine estimated depths of the object by using a depth estimator that receives the object image as input and outputs the estimated depths in the object image, (c) determine whether the estimated depths are useable by using an identifier that receives at least one of the object image and an object image feature quantity extracted from the object image as input and outputs a state in which the estimated depths are usable or unusable, (d) when the estimated depths are usable, recognize the position and posture of the object by using the estimated depths and the object image, and (e) when the estimated depths are unusable, determine measured depths of the object with a depth sensor and recognize the position and posture of the object by using the measured depths and the object image.

BRIEF DESCRIPTION OF THE DRAWINGS

FIG. 3 is a descriptive diagram showing the function of a depth estimator.

FIG. 4 is a descriptive diagram showing the functions of a feature quantity extraction section and an identifier.

FIG. 5 is a descriptive diagram showing the function of a recognition section.

FIG. 8B is a flowchart showing the procedure of detailed processes in step S200.

DESCRIPTION OF EXEMPLARY EMBODIMENTS

Figure 1:
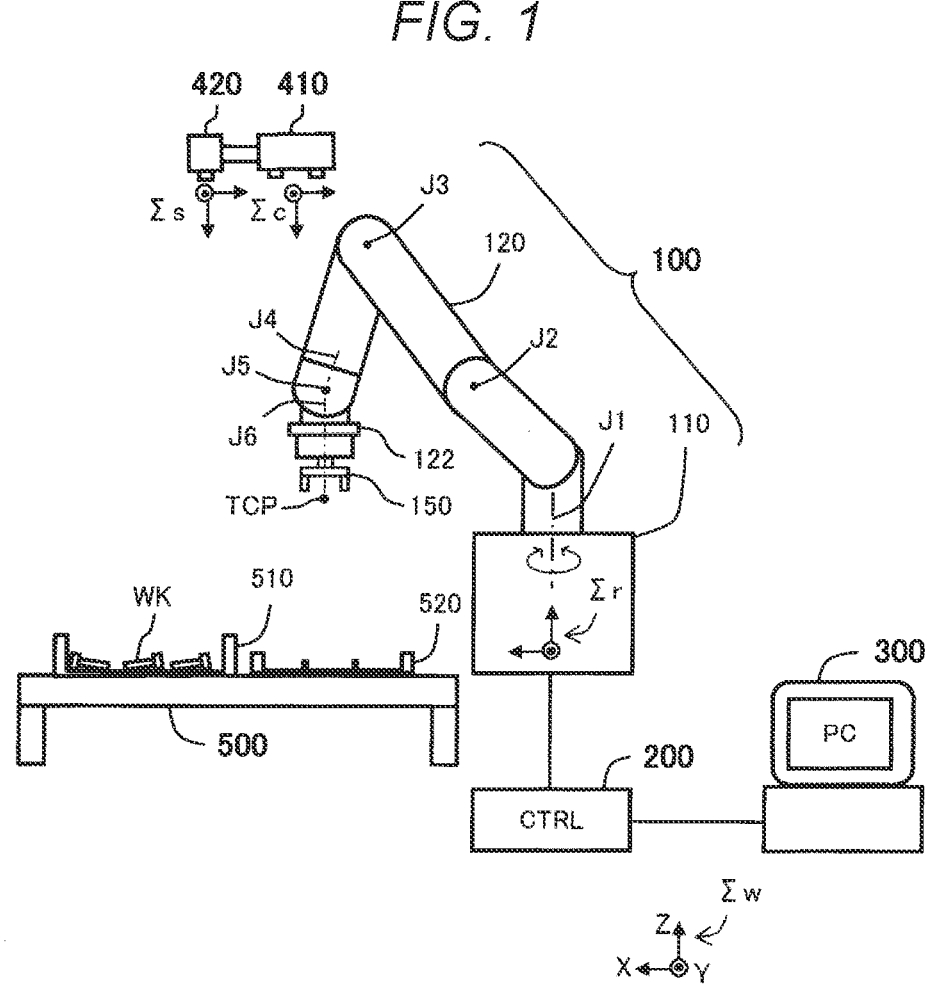
FIG. 1 is a descriptive diagram showing the configuration of a robot system according to an embodiment.

FIG. 1 is a descriptive view showing an example of a robot system according to an embodiment. The robot system includes a robot 100, a controller 200, which controls the robot 100, an information processing apparatus 300, a camera 410, a depth sensor 420, and a worktable 500. The information processing apparatus 300 is, for example, a personal computer.

The robot 100 includes a base 110 and a robot arm 120. A robot hand 150 as an end effector is attached to an arm end 122, which is a distal portion of the robot arm 120. The robot hand 150 can be realized as a gripper or a suction pad capable of gripping a workpiece WK. A tool center point (TCP) as a control point of the robot 100 is set at a distal portion of the robot hand 150. Note that the control point TCP can be set at any position.

The portions that form the robot arm 120 are sequentially coupled to each other via six joints J1 to J6. Out of the joints J1 to J6, three joints J2, J3, and J5 are bending joints, and the other three joints J1, J4, and J6 are torsional joints. A six-axis robot is shown by way of example in the present embodiment, and a robot having any robot arm mechanism including a plurality of joints can be used. The robot 100 in the present embodiment is a vertically articulated robot, and may instead be a horizontally articulated robot.

A first tray 510 and a second tray 520 are placed on the worktable 500. The first tray 510 accommodates a plurality of workpieces WK. The second tray 520 is used as a location where a workpiece WK removed from the first tray 510 is placed. The robot 100 removes a workpiece WK from the first tray 510 and places the removed workpiece WK in the second tray 520. In this process, the workpiece WK is placed at a predetermined position in the second tray 520 in a predetermined posture. To perform the operation accurately, the position and posture of the workpiece WK is recognized. The workpiece WK is also called an "object". The position and posture of each of a plurality of objects having the same specifications are recognized in the present embodiment, and the contents of the present disclosure are still applicable to a case where the position and posture of each of a plurality of objects having different specifications are recognized.

The camera 410, which captures an image of the workpieces WK in the first tray 510, is installed above the first tray 510. The image captured with the camera 410 and the depths measured by the depth sensor 420 are used to determine the three-dimensional position and posture of each of the workpieces WK. The three-dimensional position and posture of each of the workpieces WK is hereinafter referred to as the "position and posture" or the "position and posture of an object".

The camera 410 can, for example, be a stereo camera or a monocular camera. In the present embodiment, a stereo RGB camera is used as the camera 410. As will be described later, a depth estimator can be used to estimate depths from the image captured with the camera 410. The depth sensor 420 is preferably a sensor capable of measuring depths more accurately than the depths estimated by the depth estimator. The thus functioning depth sensor 420 can, for example, be a sensor that utilizes a pattern projection method, such as a phase shift method and a spatial code method. To use a pattern projection method, a sensor including a projector that projects a pattern in the field of view is used. An RGBD camera into which the camera 410 and the depth sensor 420 are integrated may be used. An RGBD camera is a camera including an RGB camera that captures an RGB image and a D camera that captures a depth image.

FIG. 1 shows a world coordinate system Σw, a robot coordinate system Σr, a camera coordinate system Σc, and a sensor coordinate system Σs. Axes X and Y of the world coordinate system Σw are axes extending in the horizontal direction, and an axis Z of the world coordinate system Σw is an axis extending in the vertical direction. The other coordinate systems do not show reference characters that distinguish the three coordinate axes from one another. The robot coordinate system Σr is an orthogonal coordinate system having a coordinate origin at a predetermined position in the robot 100. The camera coordinate system Σc is an orthogonal coordinate system having a coordinate origin at a predetermined position in the camera 410. The sensor coordinate system Σs is an orthogonal coordinate system having a coordinate origin at a predetermined position in the depth sensor 420. The relative relationship between the sensor coordinate system Σs and the camera coordinate system Σc is known, and the depths in the field of view of the depth sensor 420 are associated with the positions of the pixels in the image captured with the camera 410. The camera 410 has been calibrated in advance, and the position and posture in each of the coordinate systems Σw, Σr, and Σc can be converted by coordinate conversion into those in the other coordinate systems.

Figure 2:
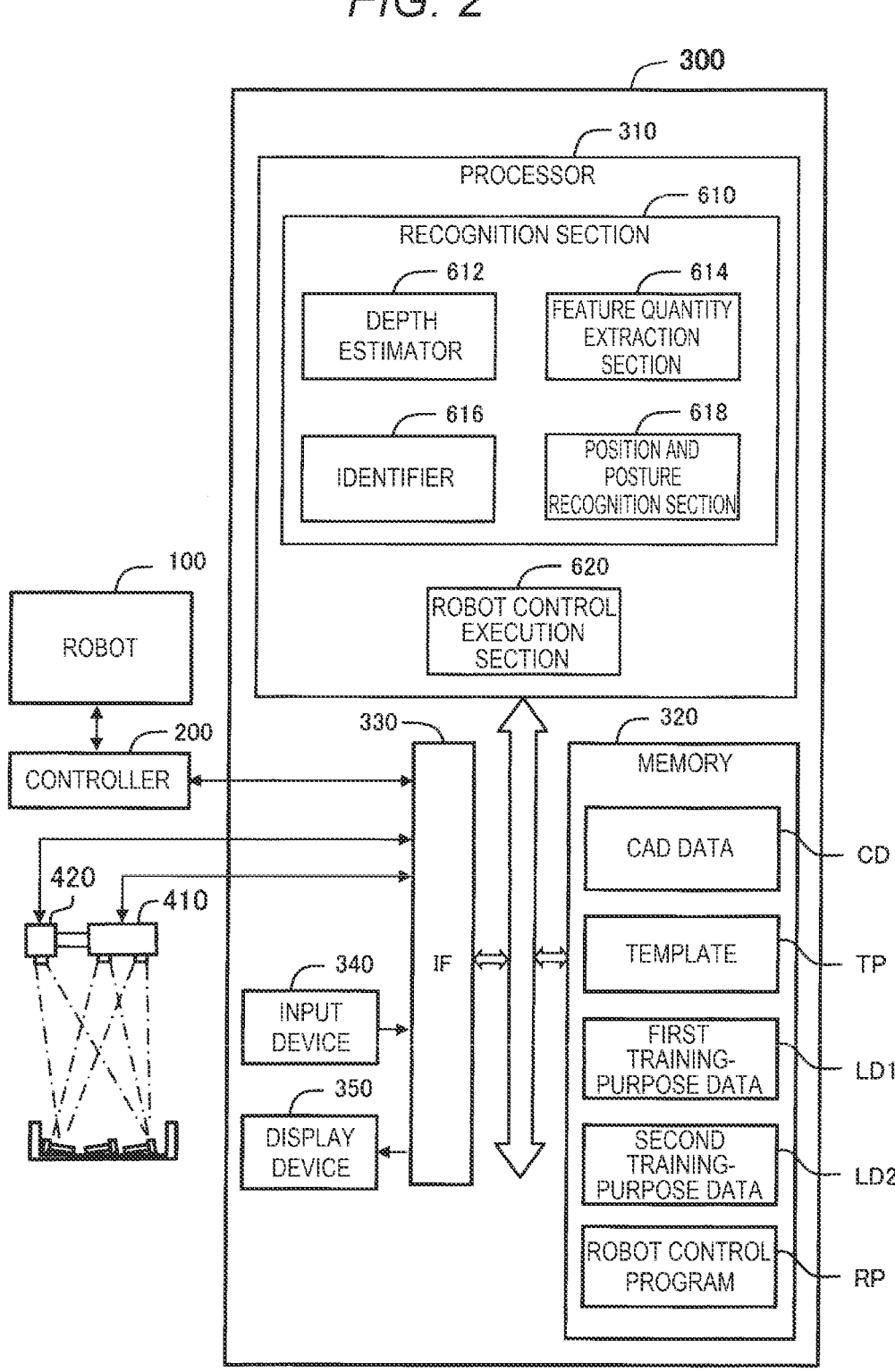
FIG. 2 is a functional block diagram of an information processing apparatus in the embodiment.

FIG. 2 is a block diagram showing the function of the information processing apparatus 300. The information processing apparatus 300 includes a processor 310, a memory 320, and an interface circuit 330. An input device 340 and a display device 350 are coupled to the interface circuit 330, so are the controller 200, the camera 410, and the depth sensor 420.

The processor 310 functions as a recognition section 610 and a robot control execution section 620. The recognition section 610 recognizes the position and posture of each of the workpieces WK by using the camera 410 and the depth sensor 420. The recognition section 610 has the functions of a depth estimator 612, a feature quantity extraction section 614, an identifier 616, and a position and posture recognition section 618. The depth estimator 612 receives the image captured with the camera 410 as input and estimates the depths in the image. The feature quantity extraction section 614 extracts a predetermined image feature quantity from the image captured with the camera 410. The identifier 616 identifies whether the estimated depths provided by the depth estimator 612 can be used to recognize the position and posture of an object. The position and posture recognition section 618 uses the estimated or measured depths and the image of the object to recognize the position and posture of the object. The robot control execution section 620 uses the recognized position and posture of the object to pick up the object. The functions of the recognition section 610 and the robot control execution section 620 are each realized by the processor 310 through execution of a computer program stored in the memory 320. It is, however, noted that some or all of the functions of the recognition section 610 and the robot control execution section 620 may be realized by a hardware circuit.

The memory 320 stores CAD data CD representing the outer shape of each of the workpieces WK, a template TP used to calculate the position and posture of the workpiece WK, first training-purpose data LD1, second training-purpose data LD2, and a robot control program RP. The first training-purpose data LD1 contains teacher data used to train the depth estimator 612. The second training-purpose data LD2 contains teacher data used to train the identifier 616. The robot control program RP is formed of a plurality of instructions that operate the robot 100.

Figure 3:
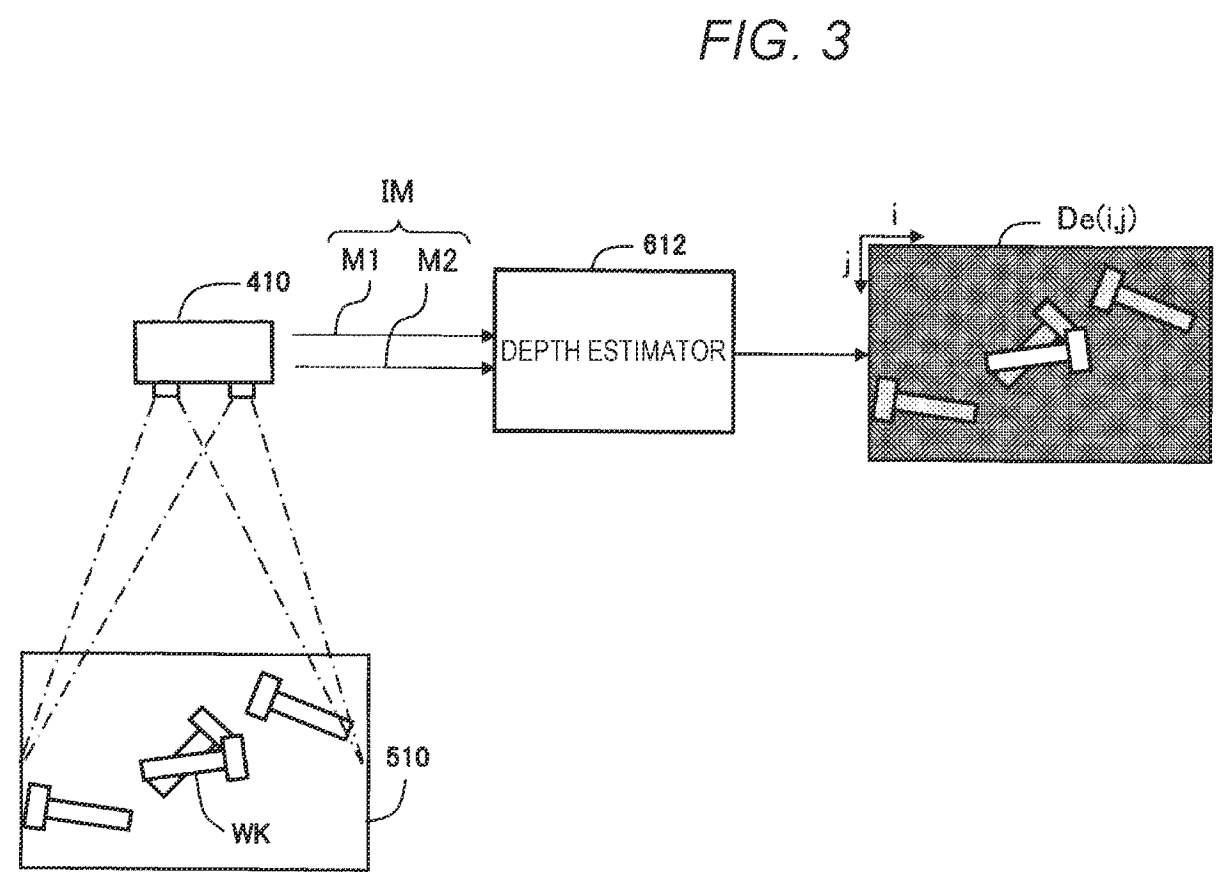

FIG. 3 is a descriptive diagram showing the function of the depth estimator 612. The camera 410 in the present embodiment, which is a stereo camera, creates an object image IM containing two images M1 and M2. The "object image IM" means a captured image containing one or more workpieces WK. The depth estimator 612 receives any captured image captured with the camera 410 as input and outputs estimated depths De(i,j) in the captured image. The symbol (i,j) denotes the two-dimensional coordinates of each of the estimated depths De. The estimated depths De(i,j) preferably have the same resolution as that of the object image IM, and may instead have a resolution different from that of the object image IM.

The depth estimator 612 can be configured as a machine learning model. The depth estimator 612 may, for example, be the depth estimator disclosed in WO 2020/230214, or the neural network disclosed in FIG. 1 of Iro Laina, Christian Rupprecht, Vasileios Belagianis, Federico Tombari, and Nassir Navab, "Deeper Depth Prediction with Fully Convolutional Residual Networks", In Proc. International Conference on 3D Vision (3DV), pp. 239-248, 2016, which is described as related art in WO 2020/230214. The depth estimator 612 may instead be the neural network configuration that performs stereo depth estimation described in "End-to-End Learning of Geometry and Context for Deep Stereo Regression". In the configuration described above, a first network, which extracts feature quantities from right and left images, is coupled to a second network, which estimates parallax, and eventually converts the parallax into the depths.

Figure 4:
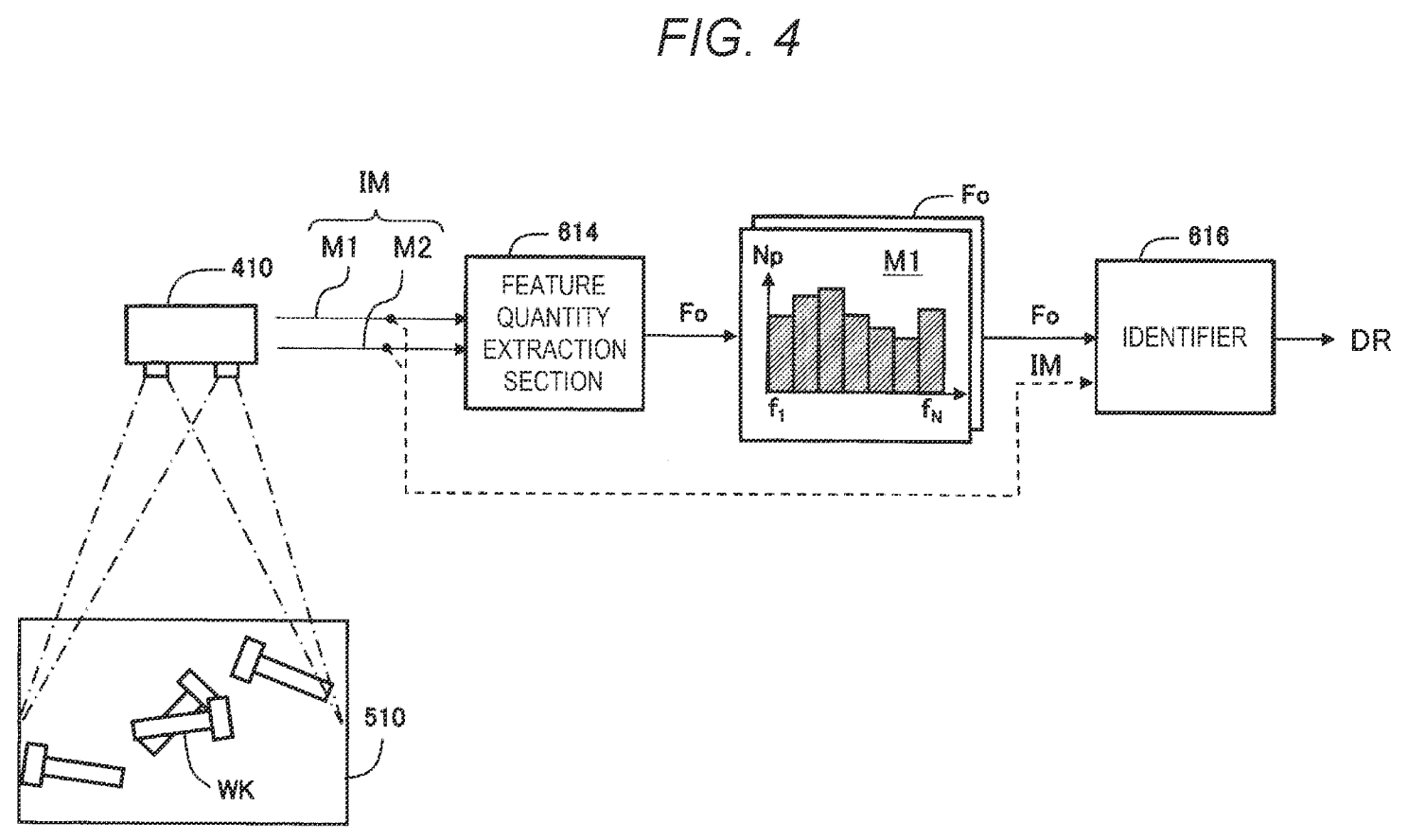

FIG. 4 is a descriptive diagram showing the functions of the feature quantity extraction section 614 and the identifier 616. The feature quantity extraction section 614 extracts an object image feature quantity Fo from the object image IM. The object image feature quantity Fo can, for example, be an indicator indicating the luminance distribution in the object image IM. The reason for using the indicator indicating the luminance distribution is that when the luminance of the object image IM greatly changes due to the influence of ambient light, the accuracy of the estimated depths provided from the object image IM is expected to decrease. In the present embodiment, a luminance value histogram is used as the object image feature quantity Fo. The luminance value histogram provided from a single RGB image shows the number of pixels Np, which is the sum of the pixels in each of N bins $f_1$ to $f_N$, into which the luminance values of the RGB image is divided, where N is an integer greater than or equal to two. Since the object image IM contains the two images M1 and M2, the object image feature quantity Fo contains 2N feature quantities. Image feature quantities other than the luminance value histogram may be used as the object image feature quantity Fo. For example, any other indicator indicating a luminance distribution, such as the mean or variance of the luminance, may be used as the object image feature quantity Fo. An indicator indicating the amount of noise in the image may still instead be used as the object image feature quantity Fo. For example, an edge quantity or a plurality of frequency components provided by discrete Fourier transformation of an image can be used as the indicator indicating the amount of noise in an image.

The identifier 616 receives at least one of the object image feature quantity Fo and the object image IM as input and outputs an identification result DR representing whether the estimated depths De provided by the depth estimator 612 are usable. The identifier 616 can be configured as a machine learning model. A variety of classification models, such as a decision tree, a support vector machine (SVM), a random forest, a convolutional neural network, and logistic regression, can be used as the machine learning model that constitutes the identifier 616.

Figure 5:
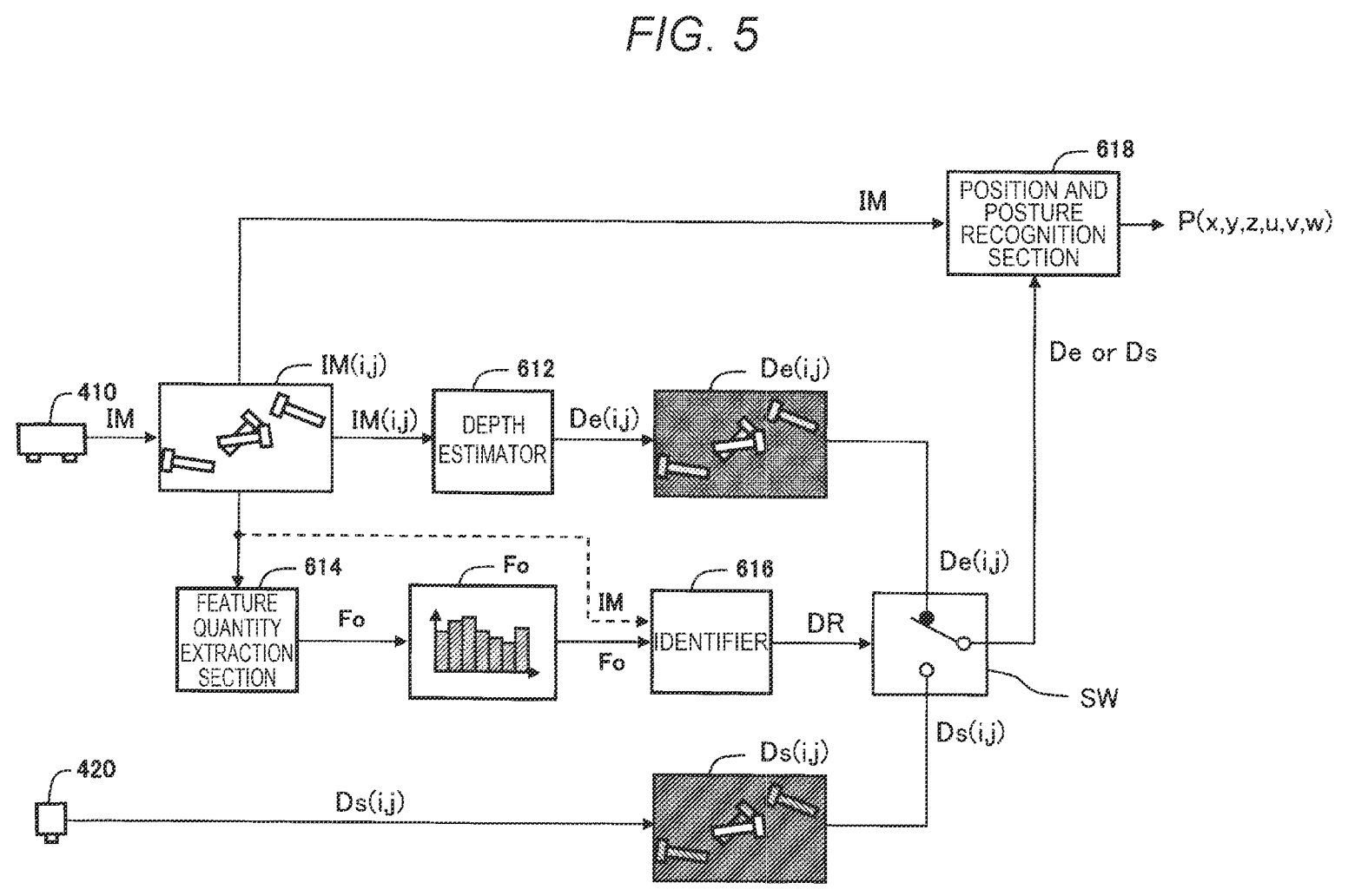

FIG. 5 is a descriptive diagram showing the function of the recognition section 610. The depth estimator 612 generates the estimated depths De(i,j) from the object image IM(i,j) provided by the camera 410. On the other hand, the depth sensor 420 generates measured depths Ds(i,j) by performing depth measurement. The depth sensor 420 preferably provides depths more accurate than the depths provided by the depth estimator 612. For example, the depth sensor 420, which uses a pattern projection method such as a phase shift method and a spatial code method, performs image capturing multiple times so that a long period is required for the depth processing, but can accurately measure depths. On the other hand, the depth estimator 612 preferably provides depths quickly in a processing period shorter than the period required by the depth sensor 420. Furthermore, the depth estimator 612 preferably provides depths more accurately than stereo block matching. The estimated depths De(i,j) and the measured depths Ds(i,j) may have different resolutions. In the present embodiment, however, it is assumed that the two types of depths have the same resolution as that of the object image IM(i,j). The feature quantity extraction section 614 extracts the object image feature quantity Fo from the object image IM(i,j). The identifier 616 receives at least one of the object image feature quantity Fo and the object image IM as input and outputs the identification result DR representing whether the estimated depths De(i,j) provided by the depth estimator 612 are usable.

The position and posture recognition section 618 selectively uses either the estimated depths De(i,j) or the measured depths Ds(i,j) to recognize a position and posture P(x,y,z,u,v,w) of the object in accordance with the identification result DR. The object image IM is also used in the recognition process. A switch SW shown in FIG. 5 represents a depth selection function of the position and posture recognition section 618. When the field of view of the camera 410 contains a plurality of workpieces, the position and posture recognition section 618 preferably recognizes the position and posture P of at least one of the workpieces.

The position and posture P(x,y,z,u,v,w) of the object are expressed, for example, in the form of the position (x,y,z) and the posture (u,v,w) in the robot coordinate system Σr. The posture (u,v,w) is expressed in the form of angles of rotation around the three axes. In place of the robot coordinate system Σr, another coordinate system, such as the world coordinate system Σw, may be used to express the position and posture of the object. Calculation of the position and posture P of the object is performed, for example, by using template matching. That is, the position and posture of the object are simulated by using the CAD data of the object to create the template TP in advance for each of a plurality of positions and postures. The position and posture recognition section 618 calculates a point group from the object image IM and the estimated depths De or the measured depths Ds, detects the object by performing template matching on the point group, and recognizes or estimates the position and posture P of the object. The point group is a set of points expressed in the form of three-dimensional coordinate values. In place of the template matching, any other method may be used to recognize the position and posture P of the object. For example, a machine learning model such as a convolutional neural network may be used to recognize the position and posture P of the object.

Figure 6:
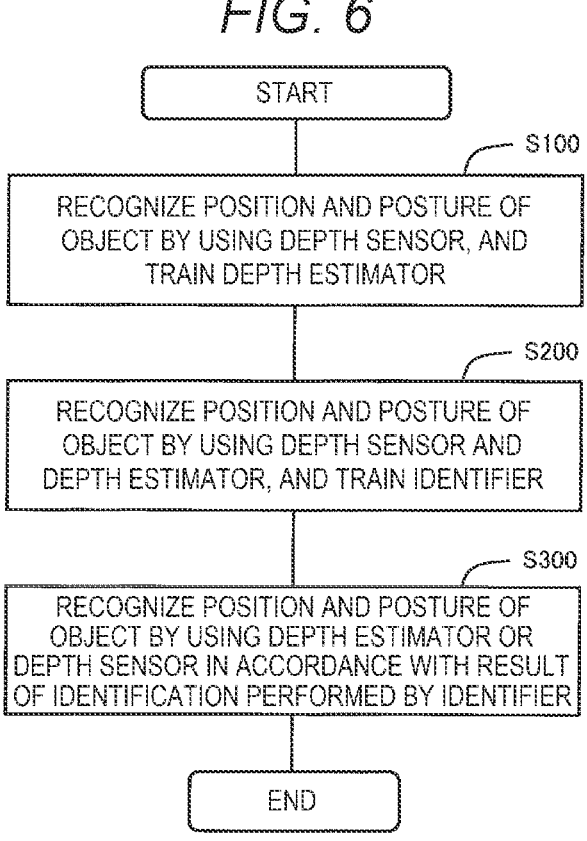
FIG. 6 is a flowchart showing the overall procedure of recognition of the position and posture of an object.

FIG. 6 is a flowchart showing the overall procedure of the object's position and posture recognition performed in the picking operation of the robot 100. In step S100, the recognition section 610 recognizes the position and posture of the object by using the measured depths Ds measured by the depth sensor 420 and further trains the depth estimator 612. In step S200, the recognition section 610 recognizes the position and posture of the object by using the measured depths Ds measured by the depth sensor 420 and the estimated depths De provided by the depth estimator 612 and further trains the identifier 616. In step S300, the recognition section 610 selectively uses either the estimated depths De provided by the depth estimator 612 or the measured depths Ds measured by the depth sensor 420 to recognize the position and posture of the object in accordance with the result of the identification performed by the identifier 616.

Step S100 is also referred to as a "first training step", and step S200 as a "second training step". In the first and second training steps, it is preferable to collect training-purpose data while causing the robot 100 to pick up the object. The depth estimator 612 and the identifier 616 can thus be trained while the object pick-up operation is actually performed. In a case where a plurality of objects stacked in bulk is picked up, picking up one object is followed by a new scene in which the position and posture of the next object are recognized. The training-purpose data can therefore be successively collected while the plurality of objects stacked in bulk are picked up one at a time. Since a scene in which many objects are present and a scene in which a few objects are present differ from each other in terms of the depth of each object, training-purpose data can be advantageously created for each of the different depths. The procedure of steps S100, S200, and S300 will be described below in detail.

Figure 7:
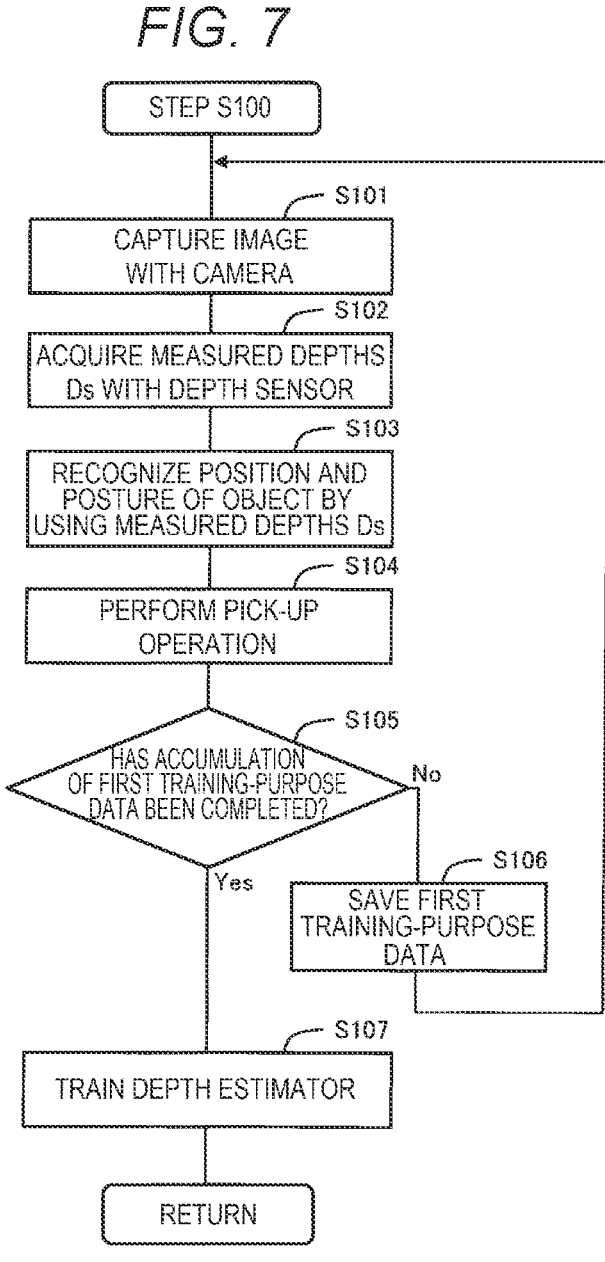
FIG. 7 is a flowchart showing the procedure of detailed processes in step S100.

FIG. 7 is a flowchart showing the procedure of detailed processes in step S100. In step S101, the recognition section 610 generates the object image IM by capturing an object of the object with the camera 410. In step S102, the recognition section 610 acquires the measured depths Ds by performing measurement with the depth sensor 420. In step S103, the position and posture recognition section 618 recognizes the position and posture of the object by using the measured depths Ds. That is, the position and posture recognition section 618 recognizes the position and posture of the object by using the measured depths Ds and the object image IM. In step S104, the robot control execution section 620 performs object picking operation based on the position and posture of the object. Step S104 may be omitted.

In step S105, the recognition section 610 evaluates whether the first training-purpose data LD1 has been sufficiently accumulated. The first training-purpose data LD1 is training-purpose data used to train the depth estimator 612 and contains the object image IM and the measured depths Ds. When the first training-purpose data LD1 has not been sufficiently accumulated, step S105 transitions to step S106, and the recognition section 610 saves a data set containing the object image IM and the measured depths Ds as the first training-purpose data LD1 in the memory 320. Step S106 then transitions back to step S101, where the processes in step S101 and the following steps are carried out again. On the other hand, when the first training-purpose data LD1 has been sufficiently accumulated, step S105 transitions to step S107, where the recognition section 610 trains the depth estimator 612 by using the first training-purpose data LD1. The order in which the steps shown in FIG. 7 are executed is presented by way of example and may be changed as required. For example, the depth estimator 612 may be trained whenever a new dataset of the first training-purpose data LD1 is provided. Also in this case, the same effect provided by the process in step S107 is provided because the depth estimator 612 is trained by using the first training-purpose data LD1 containing a plurality of data sets. When the training in step S107 is completed, the processes in step S100 are also completed. The training in step S107 is preferably performed as a background process. In this case, step S107 may be executed in parallel to step S200, which will be described later.

Figure 8A:
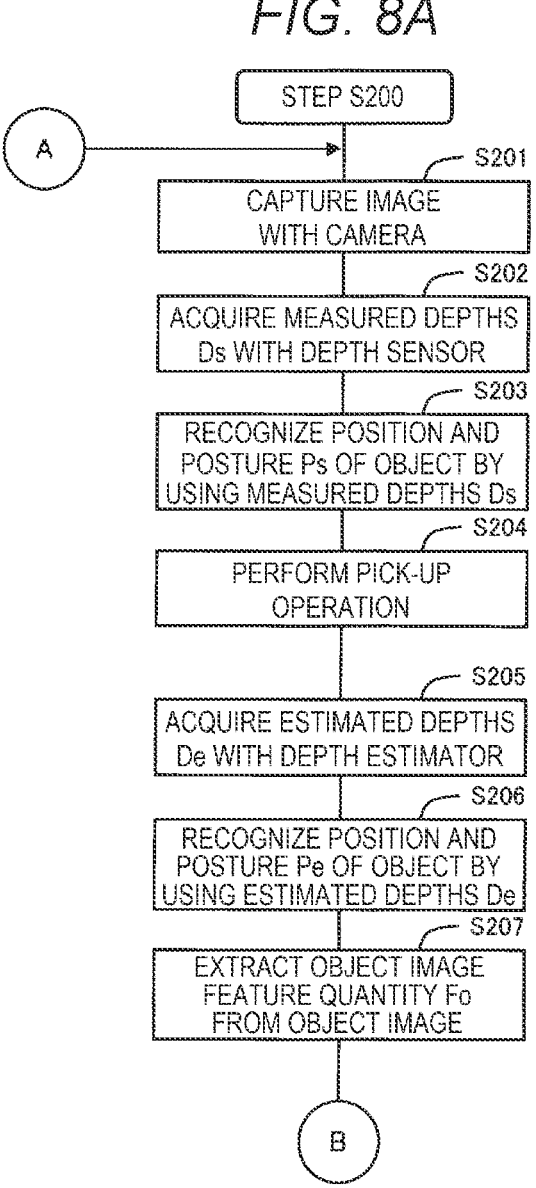
FIG. 8A is a flowchart showing the procedure of detailed processes in step S200.

FIGS. 8A and 8B are flowcharts showing the procedure of detailed processes in step S200. Steps S201 to S204 are the same as steps S101 to S104 in FIG. 7. That is, in step S201, the recognition section 610 generates the object image IM by capturing an image of the object with the camera 410. In step S202, the recognition section 610 acquires the measured depths Ds by performing measurement with the depth sensor 420. In step S203, the position and posture recognition section 618 recognizes a position and posture Ps of the object by using the measured depths Ds. Note that the "position and posture Ps" means the position and posture P(x,y,z,u,v,w) recognized by using the measured depths Ds. In step S204, the robot control execution section 620 performs object picking operation based on the object position and posture Ps. Step S204 may be omitted.

In step S205, the recognition section 610 acquires the estimated depths De from the object image IM by using the depth estimator 612. In step S206, the position and posture recognition section 618 recognizes a position and posture Pe of the object by using the estimated depths De. Note that the "position and posture Pe" means the position and posture P(x,y,z,u,v,w) recognized by using the estimated depths De. In step S207, the feature quantity extraction section 614 extracts the object image feature quantity Fo from the object image IM.

In step S211 in FIG. 8B, the recognition section 610 evaluates whether the difference between each of the measured depths Ds and the corresponding one of the estimated depths De is smaller than a specified value. A difference ΔD between the measured depth Ds and the estimated depth De is calculated, for example, by the following expression:

$$\Delta D = \Sigma |Ds(i,j) - De(i,j)| \qquad (1)$$

where Σ represents addition operation over the entire range of the two-dimensional coordinates (i,j) at the depths Ds and De. In place of using the sum of the absolute value of the difference, the average of the absolute values of the differences may be used as the difference ΔD. Still instead, the Euclidean distance between the measured depths Ds and the estimated depths De may be used as the difference ΔD.

When the depth difference ΔD is smaller than or equal to the predetermined specified value, the estimated depth De is determined to be usable in step S212, and step S212 transitions to step S214. On the other hand, when the depth difference ΔD is greater than the specified value, the estimated depth De is determined to be unusable in step S213, and step S213 transitions to step S217, which will be described later.

In step S214, the recognition section 610 evaluates whether the difference between the position and posture Ps derived by using the measured depths Ds and the position and posture Pe derived by using the estimated depths De is smaller than a specified value. The specified value is set independently of the specified value used in step S211 described above. The difference between the position and posture Ps and the position and posture Pe can be calculated, for example, as the distance between 6-dimensional vectors for which the position and posture Ps and the position and posture Pe are taken. When the difference between the position and posture Ps and the position and posture Pe is smaller than or equal to the predetermined specified value, the estimated depths De are determined to be usable in step S215, and step S215 transitions to step S217. On the other hand, when the difference between the position and posture Ps and the position and posture Pe is greater than the specified value, the estimated depths De are determined to be unusable in step S216, and step S216 transitions to step S217. The processes in steps S211 to S216 are processes of determining that the estimated depths De are usable when both the depth difference ΔD and the difference between the position and posture Ps and the position and posture Pe are smaller than or equal to the respective specified values, and determining that the estimated depths De are unusable when at least one of the depth difference ΔD and the difference between the position and posture Ps and the position and posture Pe exceeds the corresponding specified value. One of the set of the processes in steps S211 to S213 and the set of the processes in steps S214 to S216 may be omitted. It is, however, preferable to carry out at least the processes in steps S211 to S213 as the process of directly evaluating an error of the depth. The recognition section 610 determines a label indicating whether the estimated depths De are each usable by carrying out the processes in steps S211 to S216 in accordance with the difference ΔD between the estimated depth De and the measured depth Ds.

In step S217, the recognition section 610 evaluates whether the second training-purpose data LD2 has been sufficiently accumulated. The second training-purpose data LD2 is training data used to train the identifier 616 and includes at least one of the object image IM and the object image feature quantity Fo, and the labels indicating whether the estimated depths De are usable. When the object image IM is not used as input to the identifier 616, however, there is no need to save the object image IM as the second training-purpose data LD2. When the object image feature quantity Fo is not used as input to the identifier 616, the object image feature quantity Fo is unnecessary, and the step S207 described above can also be omitted.

When the second training-purpose data LD2 has not been sufficiently accumulated, step S217 transitions to step S218, and the recognition section 610 saves the data set containing at least one of the object image IM and the object image feature quantity Fo and the labels indicating whether the estimated depths De are usable as the second training-purpose data LD2 in the memory 320. Step S218 then transitions back to step S201 in FIG. 8A, where the processes in step S201 and the following steps are carried out again. On the other hand, when the second training-purpose data LD2 has been sufficiently accumulated, step S217 transitions to step S219, where the recognition section 610 trains the identifier 616 by using the second training-purpose data LD2. The order in which the steps shown in FIGS. 8A and 8B are executed is presented by way of example and may be changed as required. For example, the identifier 616 may be trained whenever a new dataset of the second training-purpose data LD2 is provided. Also in this case, the same effect provided by the process in step S219 is provided because the identifier 616 is trained by using the second training-purpose data LD2 containing a plurality of data sets. When the training in step S219 is completed, the processes in step S200 are also completed. Steps S205 to S207 and S211 to S219 are preferably executed as background processes.

Figure 9:
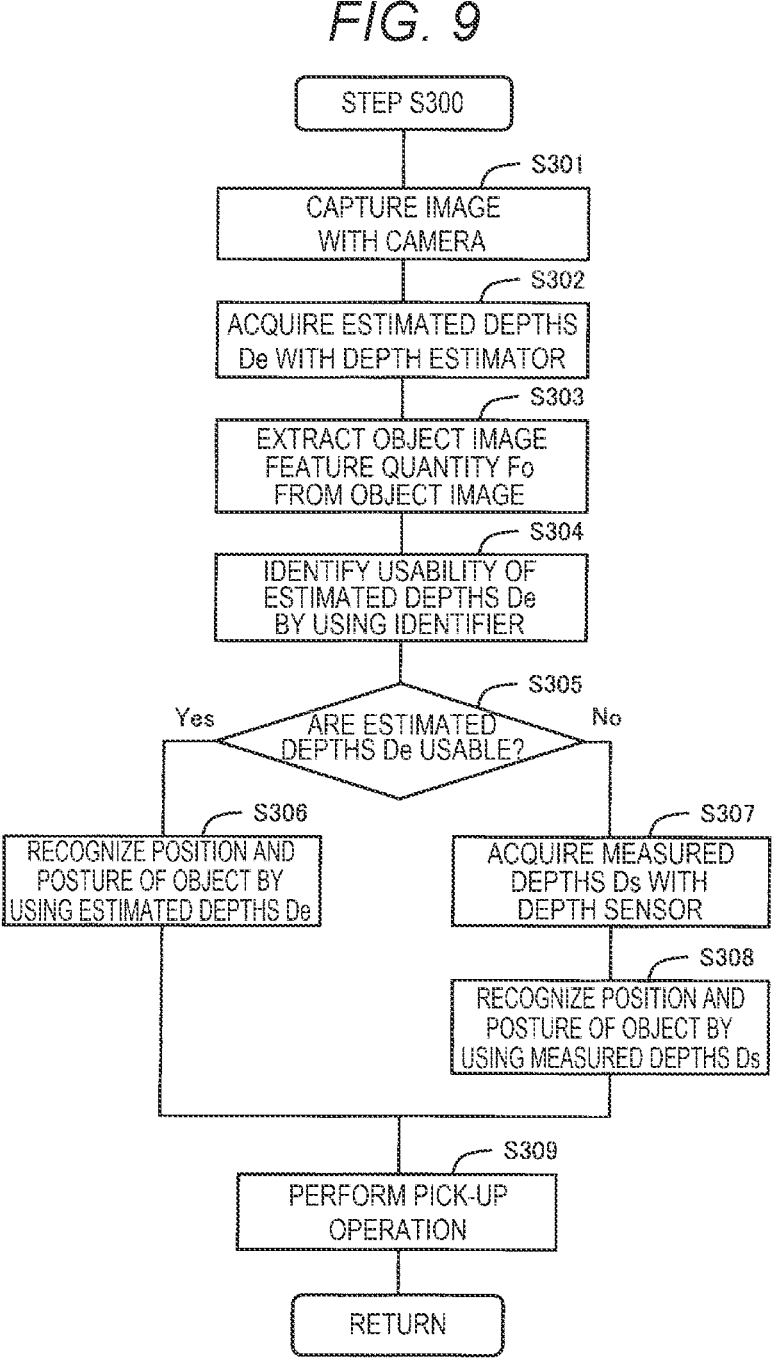
FIG. 9 is a flowchart showing the procedure of detailed processes in step S300.

FIG. 9 is a flowchart showing the procedure of detailed processes in step S300. The processes in FIG. 9 are the same as those described with reference to FIG. 5. In step S301, the recognition section 610 generates the object image IM by capturing an image of the object with the camera 410. In step S302, the recognition section 610 acquires the estimated depths De from the object image IM by using the depth estimator 612. In step S303, the feature quantity extraction section 614 extracts the object image feature quantity Fo from the object image IM. In step S304, the recognition section 610 uses the identifier 616 to identify the estimated depths De as usable or unusable based on at least one of the object image feature quantity Fo and the object image IM.

When the estimated depths De are usable, step S305 transitions to step S306, and the position and posture recognition section 618 recognizes the position and posture of the object by using the estimated depths De. On the other hand, when the estimated depths De are unusable, step S305 transitions to step S307, and the recognition section 610 acquires the measured depths Ds with the depth sensor 420. In step S308, the position and posture recognition section 618 recognizes the position and posture of the object by using the measured depths Ds. As described in FIG. 5, the object image IM is also used to recognize the position and posture of the object. In step S309, the robot control execution section 620 performs object picking operation based on the position and posture of the object. The period required for the processes in steps S302 to S304 is preferably shorter than the period required for the depth measurement in step S307. The position and posture recognition of the object can thus be efficiently performed by using the estimated depths De. The order in which the steps shown in FIG. 9 are executed is presented by way of example and may be changed as required.

As described above, in the embodiment described above, when the estimated depths De are identified as usable by the identifier 616, the position and posture of the object is recognized by using the estimated depths De, whereby the position and posture of the object can be quickly recognized with sufficient accuracy. When the estimated depths De are identified as unusable, the position and posture of the object is recognized by using the measured depths Ds measured with the depth sensor 420, whereby the position and posture of the object can be recognized with high accuracy. The contents of the present disclosure are also applicable to the process of recognizing the position and posture of an object in an apparatus other than robots.

OTHER ASPECTS

The present disclosure is not limited to the embodiment described above and can be achieved in a variety of aspects to the extent that the aspects do not depart from the intent of the present disclosure. For example, the present disclosure can be achieved in the aspects below. The technical features in the embodiment described above that correspond to the technical features in the aspects described below can be replaced or combined with each other as appropriate to solve part or entirety of the problem cited in the present disclosure or achieve part or entirety of the effects of the present disclosure. Furthermore, when any of the technical features has not been described as an essential feature in the present specification, the technical feature can be deleted as appropriate.

(1) According to a first aspect of the present disclosure, there is provided a method for recognizing the position and posture of an object. The method includes (a) generating an object image by capturing an image of the object with a camera, (b) determining estimated depths of the object by using a depth estimator that receives the object image as input and outputs the estimated depths in the object image, (c) determining whether the estimated depths are useable by using an identifier that receives at least one of the object image and an object image feature quantity extracted from the object image as input and outputs the state in which the estimated depths are usable or unusable, (d) when the estimated depths are usable, recognizing the position and posture of the object by using the estimated depths and the object image, and (e) when the estimated depths are unusable, determining measured depths of the object with a depth sensor and recognizing the position and posture of the object by using the measured depths and the object image.

According to the method described above, when the estimated depths provided by using the depth estimator are identified as usable, the estimated depths can be used to quickly recognize the position and posture of the object with sufficient accuracy. When the estimated depths are identified as unusable, the measured depths measured with the depth sensor are used to recognize the position and posture of the object, whereby the position and posture of the object can be recognized with high accuracy.

(2) In the method described above, the process of determining the estimated depths by using the depth estimator may be less accurate but quicker than the process of determining the measured depths by using the depth sensor.

According to the method described above, the position and posture of the object can be recognized at sufficient speed with sufficient accuracy by taking advantage of the features of the depth estimator and the depth sensor.

(3) The method described above may include a first training step of training the depth estimator and a second training step of training the identifier before the steps (a) to (e) described above, and the first and second training steps may each include collecting training-purpose data while causing a robot to pick up the object in accordance with the position and posture of the object.

According to the method described above, the depth estimator and the identifier can be trained while the object picking operation is actually performed.

(4) In the method described above, the first training step may include (1a) generating a first training-purpose image by capturing an image of the object with the camera, (1b) determining first training-purpose measured depths of the object with the depth sensor, (1c) recognizing the position and posture of the object by using the first training-purpose measured depths and the first training-purpose image, and causing the robot to pick up the object, (1d) generating a plurality of sets of first training-purpose data each containing the first training-purpose image and the first training-purpose measured depths by executing the steps (1a) to (1c) described above multiple times, and (1e) training the depth estimator by using the plurality of sets of first training-purpose data.

According to the method described above, the depth estimator can be appropriately trained while the object picking operation is performed.

(5) In the method described above, the second training step may include (2a) generating a second training-purpose image by capturing an image of the object with the camera, (2b) determining second training-purpose estimated depths from the second training-purpose image by using the depth estimator, (2c) determining second training-purpose measured depths of the object by using the depth sensor, (2d) recognizing the position and posture of the object by using the second training-purpose measured depths and the second training-purpose image, and causing the robot to pick up the object, (2e) determining a label indicating whether each of the second training-purpose estimated depths is usable in accordance with the difference between each of the second training-purpose estimated depths and the corresponding one of the second training-purpose measured depths, (2f) extracting a training-purpose image feature quantity of the second training-purpose image when the identifier is configured to receive the object image feature quantity as input, (2g) generating a plurality of sets of second training-purpose data each including the label and at least one of the training-purpose image feature quantity and the second training-purpose image by executing the steps (2a) to (2f) described above multiple times, and (2h) training the identifier by using the plurality of sets of second training-purpose data.

According to the method described above, the identifier can be appropriately trained while the object picking operation is performed.

(6) According to a second aspect of the present disclosure, there is provided a system for recognizing the position and posture of an object. The system includes a camera that captures an image of the object, a depth sensor that measures the depths of the object, and a recognition section that recognizes the position and posture of the object. The recognition section (a) generates an object image by capturing an image of the object with the camera, (b) determines estimated depths of the object by using a depth estimator that receives the object image as input and outputs the estimated depths in the object image, (c) determines whether the estimated depths are useable by using an identifier that receives at least one of the object image and an object image feature quantity extracted from the object image as input and outputs the state in which the estimated depths are usable or unusable, (d) when the estimated depths are usable, recognizes the position and posture of the object by using the estimated depths and the object image, and (e) when the estimated depths are unusable, determines measured depths of the object with the depth sensor and recognizes the position and posture of the object by using the measured depths and the object image.

(7) According to a third aspect of the present disclosure, there is provided a computer program that causes a processor to recognize the position and posture of an object. The computer program causes the processor to (a) generate an object image by capturing an image of the object with a camera, (b) determine estimated depths of the object by using a depth estimator that receives the object image as input and outputs the estimated depths in the object image, (c) determine whether the estimated depths are useable by using an identifier that receives at least one of the object image and an object image feature quantity extracted from the object image as input and outputs the state in which the estimated depths are usable or unusable, (d) when the estimated depths are usable, recognize the position and posture of the object by using the estimated depths and the object image, and (e) when the estimated depths are unusable, determine measured depths of the object with a depth sensor and recognize the position and posture of the object by using the measured depths and the object image.

The present disclosure can also be implemented in a variety of aspects other than those described above. For example, the present disclosure can be implemented, for example, in a robot system including a robot and a robot controller, a computer program for realizing the functions of the robot controller, a non-transitory storage medium on which the computer program is recorded.

What is claimed is:

1. A method for recognizing a position and a posture of an object, the method comprising:

(a) generating an object image by capturing an image of the object with a camera;

(b) determining estimated depths of the object by using a depth estimator that receives the object image as input and outputs the estimated depths in the object image;

(c) determining whether the estimated depths are useable by using an identifier that receives at least one of the object image and an object image feature quantity extracted from the object image as input and outputs a state in which the estimated depths are usable or unusable;

(d) when the estimated depths are usable, recognizing the position and posture of the object by using the estimated depths and the object image;

(e) when the estimated depths are unusable:
determining measured depths of the object with a depth sensor; and
recognizing the position and posture of the object by using the measured depths and the object image;

a first training step of training the depth estimator and a second training step of training the identifier before the steps (a) to (e); and the first and second training steps each include collecting training-purpose data while causing a robot to pick up the object in accordance with the position and posture of the object.

2. The method according to claim 1,
wherein the process of determining the estimated depths by using the depth estimator is less accurate but quicker than the process of determining the measured depths by using the depth sensor.

3. The control method according to claim 1,
wherein the first training step includes (1a) generating a first training-purpose image by capturing an image of the object with the camera, (1b) determining first training-purpose measured depths of the object with the depth sensor, (1c) recognizing the position and posture of the object by using the first training-purpose measured depths and the first training-purpose image, and causing the robot to pick up the object, (1d) generating a plurality of sets of first training-purpose data each containing the first training-purpose image and the first training-purpose measured depths by executing the steps (1a) to (1c) multiple times, and (1e) training the depth estimator by using the plurality of sets of first training-purpose data.

4. The control method according to claim 1,
wherein the second training step includes (2a) generating a second training-purpose image by capturing an image of the object with the camera, (2b) determining second training-purpose estimated depths from the second training-purpose image by using the depth estimator, (2c) determining second training-purpose measured depths of the object by using the depth sensor, (2d) recognizing the position and posture of the object by using the second training-purpose measured depths and the second training-purpose image, and causing the robot to pick up the object, (2e) determining a label indicating whether each of the second training-purpose estimated depths is usable in accordance with a difference between each of the second training-purpose estimated depths and the corresponding one of the second training-purpose measured depths, (2f) extracting a training-purpose image feature quantity of the second training-purpose image when the identifier is configured to receive the object image feature quantity as input, (2g) generating a plurality of sets of second training-purpose data each including the label and at least one of the training-purpose image feature quantity and the second training-purpose image by executing the steps (2a) to (2f) multiple times, and (2h) training the identifier by using the plurality of sets of second training-purpose data.

5. A system for recognizing the position and a posture of an object, the system comprising:
a camera that captures an image of the object;
a depth sensor that measures depths of the object; and
a recognition section that recognizes the position and posture of the object, wherein the recognition section (a) generates an object image by capturing an image of the object with the camera, (b) determines estimated depths of the object by using a depth estimator that receives the object image as input and outputs the estimated depths in the object image, (c) determines whether the estimated depths are useable by using an identifier that receives at least one of the object image and an object image feature quantity extracted from the object image as input and outputs a state in which the estimated depths are usable or unusable, (d) when the estimated depths are usable, recognizes the position and posture of the object by using the estimated depths and the object image, (e) when the estimated depths are unusable:
determines measured depths of the object with the depth sensor; and
recognizes the position and posture of the object by using the measured depths and the object image, a first training step of training the depth estimator and a second training step of training the identifier before the steps (a) to (e), and the first and second training steps each include collecting training-purpose data while causing a robot to pick up the object in accordance with the position and posture of the object.

6. A non-transitory storage medium storing a computer program that causes a processor to recognize a position and a posture of an object, the computer program causing the processor to (a) generate an object image by capturing an image of the object with a camera, (b) determine estimated depths of the object by using a depth estimator that receives the object image as input and outputs the estimated depths in the object image, (c) determine whether the estimated depths are useable by using an identifier that receives at least one of the object image and an object image feature quantity extracted from the object image as input and outputs a state in which the estimated depths are usable or unusable, (d) when the estimated depths are usable, recognize the position and posture of the object by using the estimated depths and the object image, (e) when the estimated depths are unusable:
determine measured depths of the object with a depth sensor; and
recognize the position and posture of the object by using the measured depths and the object image, a first training step of training the depth estimator and a second training step of training the identifier before the steps (a) to (e), and the first and second training steps each include collecting training-purpose data while causing a robot to pick up the object in accordance with the position and posture of the object.

* * * * *